Patented June 5, 1951

2,555,704

UNITED STATES PATENT OFFICE 2,555,704

PROCESS OF PREPARING 14-HYDROXY STEROIDS

Leopold Ruzicka and Placidus Plattner, Zurich, Switzerland, assignors to Ciba Pharmaceutical Products, Inc., Summit, N. J.

No Drawing. Application November 26, 1946, Serial No. 712,258. In Switzerland November 30, 1945

3 Claims. (Cl. 260—397.4)

1

The present invention relates to 14-hydroxy-cyclopentanopolyhydrophenanthrenes and 14-hydroxy-polyhydrochrysenes and to processes for their production.

The genins of strophanthus, digitalis and squill glucosides as well as the toad poisons are steroids which contain a hydroxyl group in the 14-position of the cyclopentanopolyhydrophenanthrene nucleus. Important physiological properties are attributed to this hydroxy group. However, synthetic methods of introducing a hydroxy group into the 14-position of the steroid nucleus are unknown at the present time.

It has now been found that 14-hydroxy-cyclopentanopolyhydrophenanthrene or polyhydrochrysene derivatives are produced by subjecting the respective 14,15-oxides to a reductive cleavage treatment with formation of a hydroxyl group. The successful character of this treatment could not be foreseen and is wholly unexpected inasmuch as attempts to effect the reductive cleavage of 8,14-oxido compounds have been consistently unsuccessful.

Suitable starting materials for the process of this invention are those saturated and unsaturated cyclopentanopolyhydrophenanthrene and polyhydrochrysene compounds which contain an oxido group in the 14,15-positions and are otherwise substituted as desired. Particularly desirable are those compounds containing also in the 17-position a group having the desired steric relationship such as a free or esterified carboxyl, hydroxyacetyl, acyl or lactone group or other aliphatic, alicyclic, heterocyclic or aromatic residue which may be substituted in any desired manner. The process is carried out advantageously with compounds having a double bond on the 16-carbon atom. Examples of satisfactory starting compounds are $\Delta^{16}$-3-acetoxy-14,15-oxido-etio-allocholenic acid methyl ester $\Delta^{16}$-3,21-diacetoxy-14,15-oxido-20-keto allopregnene 3,12-dihydroxy-14,15-oxido-cholanic acid or the corresponding -17-isocholanic acid, the oxides of $\beta$-ergostenol and $\beta$-cholestenol as well as analogous derivatives of the dimethylpolyhydrochrysene series (D-homo-steroid series).

The 14,15-oxides are obtained by oxidation of the corresponding 14,15-unsaturated derivatives with peracids such as peracetic acid, perbenzoic acid and monoperphthalic acid, or by removing hydrogen halide from the halogenhydrins of the 14,15-unsaturated compounds.

2

The reductive cleavage of the 14,15-oxides is carried out by hydrogenation, (a) with metallic catalysts such as platinum, palladium, nickel or copper in solvents or diluents, or (b) with nascent hydrogen obtained from the reaction of alkali metals or their amalgams with alcohol, water or moist solvents; from the reaction of alcoholates of metals such as aluminum or magnesium with secondary alcohols; or from the reaction of metals or their salts such as zinc, stannous chloride or iron with organic or inorganic acids. The reductive cleavage of the oxide ring also may be accomplished by electrolytic or biochemical methods. Finally, the reductive cleavage may be effective through the action of organo-metallo compounds such as organomagnesium halides or of hydrocyanic acid in which cases the tertiary hydroxyl group is formed in the 14-position and simultaneously the organic residue of the organo-metallo compound or the cyano group enters the 15-position.

The products of the invention are useful as therapeutic agents or as intermediate products for the preparation of therapeutically useful compounds.

The invention is described more specifically in the following examples wherein the same relation exists between parts by weight and parts by volume as exists between grams and cubic centimeters.

Example 1

20 parts by weight of $\Delta^{16}$-3$\beta$-acetoxy-14,15-oxido-etio-allocholenic acid methyl ester of the formula

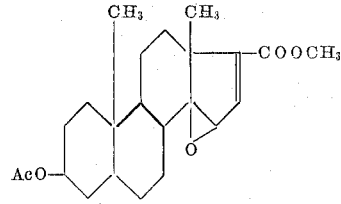

(prepared for example by boiling, while exposing it to light, $\Delta^{16}$-3$\beta$-acetoxy-etio-allocholenic acid methyl ester in carbon tetrachloride with bromosuccinimide, removal of succinimide and solvent, splitting off hydrogen bromide from the crude reaction product by boiling with pyridine, re-acetylating and oxidizing the resultant $\Delta^{14,16}$-3$\beta$-acetoxy-etio-allocholadienic acid methyl ester with perbenzoic acid in chloroform) are shaken in 500 parts by volume of ethyl alcohol with 0.7 part by weight of previously reduced platinum oxide in an atmosphere of hydrogen until the absorption of hydrogen ceases. Filtration from the catalyst is then effected, the filtered solution then evaporated to dryness and the residue purified chromatographically on aluminum oxide. The main products of the reaction are two 3β-acetoxy-14-hydroxy-etio-allochclanic acid methyl esters, isomeric at the 17-position and having, respectively, melting points of 204.5–205.5° C. and 148.5–150° C. These may be separated from each other and from the by-products of the hydrogenation for example chromatographically with the aid of aluminum oxide, from the first isomer is eluted by means of a petroleum ether-benzol mixture (1:1), the latter isomer by means of benzol and ether. The formula of the products is

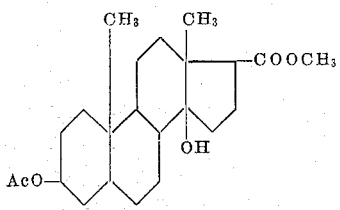

Example 2

38 parts by weight of 3α,12α-diacetoxy-14,15-oxido-cholanic acid methyl ester of the formula

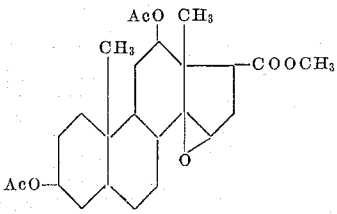

obtained through oxidation of Δ$^{14}$-3α,12-diacetoxy cholenic acid methyl ester with perbenzoic acid in chloroform, are shaken in 150 parts by volume of ethyl alcohol with 13 parts by weight of previously reduced platinum oxide in an atmosphere of hydrogen. After 23 hours, the catalyst is filtered off, the solution evaporated to dryness and the residue purified by chromatography on aluminum oxide. The benzol eluate yields, after recrystallization from methanol, pure 3α,12α-diacetoxy-14-hydroxy-cholanic acid methyl ester of melting point 128–129° C. of the formula

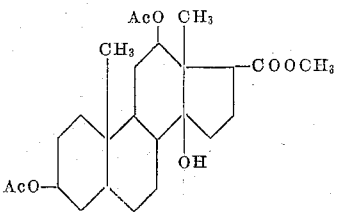

If in lieu of Δ$^{14}$-3α,12α-diacetoxy-cholenic acid-methyl-ester the free Δ$^{14}$-3α,12α-dihydroxy-cholenic acid of melting point 269–271° C., or its methyl ester of melting point 89–90° C., is subjected to oxidation by means of perbenzoic acid, the reaction product obtained is 3α,12α-dihydroxy-14,15-oxido-cholanic acid of melting point 181–182° C. or its methyl ester of melting point 235–236° C., respectively. If these 14,15-oxides are hydrogenated in rectified alcohol with platinum oxide as catalyst, the 14-hydroxy-steroids are formed, i. e., 3α,12α,14-trihydroxy-cholanic acid which decomposes at 200–207° C. and its methylester of melting point 145–150° C.

Example 3

8 parts by weight of 3β-acetoxy-14,15-oxido-17-iso-etio-allo-cholanic acid methyl ester of the formula

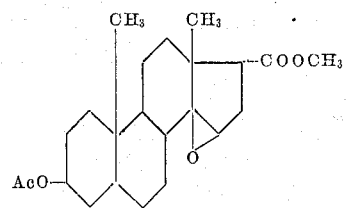

are hydrogenated in 800 parts by volume of ethyl alcohol with 0.4 part by weight of previously reduced platinum oxide until the cessation of hydrogen consumption. Then the solution is filtered free from the platinum, evaporated to dryness in vacuo and the crude product thus obtained recrystallized from ether-petroleum ether mixture. There is thus obtained the 3β-acetoxy-14-hydroxy-17-iso - etio-allo - cholanic acid methyl ester which melts at 148.5–150° C. and is identical with reaction product obtained according to Example 1.

The 3β-acetoxy-14,15-oxido-17-iso - etio - allo-cholanic acid methyl ester used as starting material can be prepared as follows, for example starting from Δ$^{16}$-3β-acetoxy-etio-allo-cholenic acid methyl ester:

3.7 parts by weight of Δ$^{16}$-3β-acetoxy-etio-allo-cholenic acid methyl ester are boiled under reflux for several minutes, and while being exposed to light, in 80 parts by volume of carbon tetrachloride with 2 parts by weight of bromosuccinimide. After cooling, filtration is effected, the solvent evaporated in vacuo from the filtrate and the oily residue thus obtained boiled in 20 parts by volume of pyridine, to which after 20 minutes, 5 parts by volume of acetic anhydride are added. After altogether a half hour, the solution is poured into water, the mixture extracted with ether, the ether extract washed with dilute hydrochloric acid, soda solution and water, dried with sodium sulfate, decolorized with animal charcoal and the ether evaporated. The solidified crude product is recrystallized from methanol. There is obtained thus in very good yield Δ$^{14,16}$-3β-acetoxy-etio-allo-choladienic acid methyl ester which melts at 148.5–150° C.

2 parts by weight of Δ$^{14,16}$-3β-acetoxy-etio-allo-choladienic acid methyl ester, dissolved in 15 parts by volume of choloroform, are reacted wtih a solution of 1.25 parts by weight of perbenzoic acid in 20 parts by volume of chloroform and left for several hours at room temperature in darkness. Hereupon, with the addition of ice, the solution is diluted with 300 parts by volume of ether, washed with dilute sodium carbonate solution and water, dried and evaporated. The residue is dissolved in ether, filtered through aluminum oxide and the colorless oil obtained hereupon recrystallized from methanol. The Δ$^{16}$-3β-acetoxy-14,15-oxido-etio-allo-cholenic acid methyl ester thus obtained melts at 115–117° C.

1.15 parts by weight of Δ$^{16}$-3β-acetoxy-14,15-oxido-etio-allo-cholenic acid methyl ester in 200 parts by volume of ethyl alcohol are shaken under hydrogen with 1.4 parts by weight of a previously hydrogenated palladium calcium carbonate catalyst. After 8 parts by volume of hydrogen (about 1 mol.) are absorbed, the hydrogenation is interrupted. The catalyst is filtered off, the filtrate evaporated to dryness the residue recrystallized several times from ether-petroleum ether and there is thus obtained 3β-acetoxy-14,15-oxido-17-iso-etio-allo-cholanic acid methyl ester of melting point 183-184° C.

Example 4

1 part by weight of Δ¹⁶-3β-acetoxy-14,15-oxido-20-keto-allo-pregnene of the formula

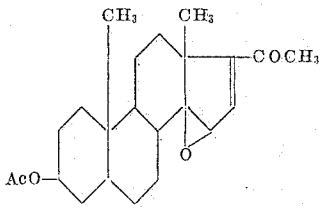

is shaken under hydrogen in 150 parts by volume of alcohol with 0.03 part by weight of previously reduced platinum oxide. The hydrogenation comes to a stop after 205 parts by volume of hydrogen (about 3 mols.) are absorbed. It is filtered from the catalyst, the filtrate evaporated to dryness, the residue dissolved in 4 parts by volume of glacial acetic acid and reacted with a solution of 0.2 part by weight of chromium trioxide in 4 parts by volume of glacial acetic acid and kept 20 hours at 20° C. After the addition of a little methanol, it is poured into water, taken up in ether, the ether solution washed with water and sodium bicarbonate solution, dried over sodium sulfate and evaporated to dryness. The residue is purified chromatographically, whereby in addition to 3β-acetoxy-20-keto-17-iso-5,14-diallopregnane of melting point 104–106° C., there is isolated 3β-acetoxy-14-hydroxy-17-iso-20-keto-allo-pregnane of melting point 165–166° C. of the formula

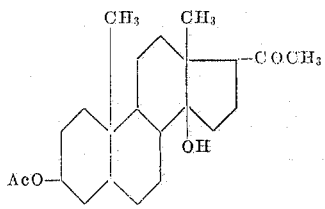

The Δ¹⁶-3β-acetoxy-14,15-oxido-20-keto-allopregnene employed as starting material may be obtained in the following manner:

While being exposed to light, 11 parts by weight of Δ¹⁶-3β-acetoxy-20-keto-allo-pregnene in 100 parts by volume of carbon tetrachloride are boiled 15 minutes under reflux with 6.1 parts by weight of bromosuccinimide. After cooling, it is filtered, the solvent evaporated in vacuo from the filtrate, and the residue in 150 parts by volume of pyridine boiled 5 hours under reflux, 40 parts by volume of acetic anhydride being added in the last ten minutes. After evaporation of the pyridine and acetic anhydride in vacuo, the residue is taken up in ether, the ether solution washed with 2-normal sulfuric acid, sodium bicarbonate solution and water, dried with sodium sulfate, decolorized with charcoal and the ether evaporated. The solidified residue yields after recrystallization from chloroform-ethanol Δ¹⁴,¹⁶-3β-acetoxy-20-keto-allo-pregnadiene of melting point 170-171° C.

6.5 parts by weight of the last-named compound dissolved in 20 parts by volume of chloroform, are reacted with a solution of 4.4 parts by weight of monoperphthalic acid in 63.5 parts by volume of ether and stored 2 days at room temperature in darkness. Following this, the solution is filtered through a column of 80 parts by weight of aluminum oxide and the column washed well with a mixture of ether and benzol. On evaporation of the solvent, the filtrate leaves behind a solidified residue which after recrystallization from chloroform—ethanol yields Δ¹⁶-3β-acetoxy-14,15-oxido - 20 - keto-allo-pregnene in the form of thick plates of melting point 193–195° C.

The series of reactions described in this example may be carried out in analogous manner with Δ¹⁶-3β-hydroxy - 20 - keto - allo - pregnane which is not acylated in 3-position and which melts at 202–204° C., as starting material. The end product obtained in such case is 3β-14-dihydroxy-17-iso-20-keto-allo-pregnane of melting point 195–198° C.

Example 5

0.2 part by weight of Δ¹⁶-3β-acetoxy-14,15-oxido-20-keto-allo-pregnene are shaken under hydrogen in 70 parts by volume of alcohol with 0.28 part by weight of a 2% previously reduced palladium-calcium carbonate catalyst. After absorption of 24 parts by volume (about 2 mols.) of hydrogen, the hydrogenation comes to a stop, whereupon the catalyst is filtered off. The filtrate is evaporated to dryness and the residue purified through chromatography.

In addition to a small quantity of 3β-acetoxy-14 - hydroxy-20-keto - allo - pregnane of melting point 172–174° C. there is obtained an about 60 per cent yield of the 17-isomeric 3β-acetoxy-14-hydroxy-17-iso-20-keto-allo-pregnane of melting point 165–166° C. ([α]D=—39°)

Example 6

0.2 part of Δ¹⁶-3β,21-diacetoxy-14,15-oxido-20-keto-allo-pregnene of the formula

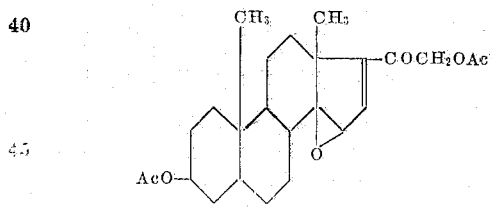

is agitated under hydrogen in 40 parts of rectified spirit with 0.28 part of a 2.4 per cent prereduced palladium-barium sulfate catalyst. The hydrogenation ceases after 27 parts by volume of hydrogen (about 2.3 mols.) have been consumed. The catalyst is then removed by filtration. The filtrate is evaporated to dryness and the residue purified by chromatography. 3β,21-diacetoxy-14-hydroxy-17-iso-20-keto-allo - pregnane is thus obtained which melts at 91–92° C. The formula of the product is

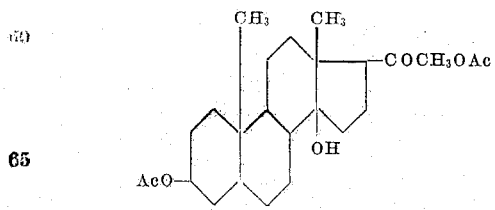

The Δ¹⁶-3β,21-diacetoxy-14,15 - oxido-20-keto-allo-pregnene used as starting material may be prepared in the following manner:

3β,21-diacetoxy-20-keto - allo - pregnane, dissolved in a mixture of carbon tetrachloride and glacial acetic acid is caused to react with 2 equivalent weights of bromine with the addition of anhydrous aluminum chloride. From the resultant 3β,21-diacetoxy-17-bromo-20-keto-allo-pregnane of melting point 144–145° C. hydrogen bromide is split off by boiling with pyridine. The homogeneous reaction product is $\Delta^{16}$-3β,21-diacetoxy-20-keto-allo-pregnene which melts at 126–127° C. By causing this compound to react with bromosuccinimide in carbon tetrachloride with exposure to light and subsequent treatment of the reaction product with boiling pyridine, $\Delta^{14,16}$-3β,21-diacetoxy-20-keto-allo-pregnadiene, melting at 117–118° C. is obtained.

This compound is dissolved in chloroform and mixed with a solution of monoperphthalic acid in ether. After a reaction period of 48 hours the solution is filtered through aluminum oxide and filtrate evaporated to dryness. The residue is recrystallized from ethanol and yields $\Delta^{16}$-3β,21-diacetoxy-14,15-oxido-20-keto-allo-pregnene in the form of coarse needles melting at 154–155° C.

*Example 7*

5 parts by weight of $\Delta^{16}$-3β-acetoxy-etio-allo-cholenic acid-nitrile, or the corresponding benzoate of melting point 159–161° C. are dissolved in 40 parts by volume of carbon tetrachloride and boiled with 3.45 parts by weight of bromosuccinimide in a reflux apparatus for 15 minutes. The resultant succinimide is removed by filtration, the solvent is eliminated under reduced pressure and the glassy residue boiled for 2½ hours with 30 parts by volume of pyridine under reflux and 2 parts by volume of acetic anhydride are added 2 hours later. The solution is poured into cooled hydrochloric acid, extracted with ether and the ethereal solution washed with sodium bicarbonate solution and water until neutral. The crude product obtained after drying and removal of the ether by distillation yields, when crystallized once from methanol, 3.5 parts by weight of $\Delta^{14,16}$-3β-acetoxy-etio-allo-choladienic acid nitrile of melting point 143–145° C.

1 part by weight of this nitrile, dissolved in 7 parts by volume of chloroform are mixed with a solution of 0.48 part by weight of perbenzoic acid in 10 parts by volume of chloroform and allowed to stand for 12 hours at room temperature. The solution is then filtered through aluminum oxide and the column well washed with ether. After removing the solvent by distillation, there remains 1 part by weight of crude $\Delta^{16}$-3β-acetoxy-14,15-oxido-etio-allo-cholenic acid nitrile of the formula

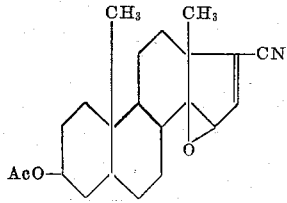

20 parts by weight of this oxido-nitrile are agitated in 500 parts by volume of ethyl alcohol with 0.7 part by weight of previously reduced platinum oxide in an atmosphere of hydrogen. When 300 parts by volume of hydrogen are absorbed, the hydrogenation is stopped, the solution filtered and evaporated to dryness. The residue, a mixture of the 17-isomeric 3β-acetoxy-14-hydroxy-etio-allo-cholanic acid nitriles, is dissolved in 600 parts by volume of ethanol and mixed with 105 parts by weight of sodium hydroxide in 300 parts by volume of water and heated to 140–160° C. for six hours in a pressure vessel. The reaction product is acidified, then taken up in ethyl acetate and the solution is extracted 3 times with dilute sodium carbonate solution. When the sodium carbonate solution has been acidified with dilute sulfuric acid, the precipitated acids are taken up in ethyl acetate. After drying and removal of the solvent by distillation, there are obtained 15 parts by weight of a crude acid mixture from which by fractionated recrystallization from ethyl acetate or methanol, the 3β,14-dihydroxy-etio-allo-cholanic acid melting at 207° C. with decomposition, and the 3β,14-dihydroxy-17-iso-etio-allo-cholanic acid of melting point 300–303° C. can be isolated. These are the free oxyacids of the acetyl-methyl esters described in Example 1.

*Example 8*

$\Delta^{5,16}$-3β-acetoxy-etio-choladienic acid methyl ester of melting point 163–164° C. is dissolved in ether and the quantity of bromine in acetic acid calculated to saturate one double linkage is added dropwise. After the usual processing the crude 5,6-dibromide is caused to react with bromosuccinimide in carbon tetrachloride, while being exposed to light, in which operation the bromine atom, just introduced into the 15-position, is split off in the form of hydrogen bromide by prolonged boiling in the same solvent. The resultant $\Delta^{14,16}$-3β-acetoxy-5,6-dibromo-etio-choladienic acid-methyl ester is freed from bromine by means of zinc dust in glacial acetic acid.

The resultant $\Delta^{5,14,16}$-3β-acetoxy-etio-cholatrienic acid-methyl ester is dissolved in chloroform and mixed with the quantity of perbenzoic acid in chloroform calculated to oxidize one double linkage and the mixture is allowed to stand for 24 hours at −10° C. The reaction product is filtered through aluminum oxide and the $\Delta^{5,16}$-3β-acetoxy-14,15-oxido-etio-choladienic acid-methyl ester, which is obtained as the main product of the reaction, is hydrogenated in rectified alcohol in a manner analogous to that described in Example 1, but with the use of Raney nickel as catalyst because platinum oxide would also affect the 5,6-double linkage. After chromatographic purification of the hydrogenation product, a mixture of the 17-isomeric $\Delta^5$-3β-acetoxy-14-hydroxy-etio-cholenic acid-methyl ester is obtained.

*Example 9*

$\Delta^{16}$-3β-acetoxy-5,6α-oxido-etio-allo-cholenic-acid-methyl ester of melting point 168–170° C. is caused to react with bromosuccinic acid while being exposed to light, and hydrogen bromide split off from the resultant 15-bromo-derivative by boiling with pyridine. By reacting the resultant $\Delta^{14,16}$-3β-acetoxy-5,6α-oxido-etio-choladienic acid-methyl ester with perbenzoic acid in chloroform, there is obtained $\Delta^{16}$-3β-acetoxy-5,6α-;14,15-dioxido-etio-cholenic acid-methyl ester which by hydrogenation in glacial acetic acid with platinum oxide as catalyst yields a mixture of the 17-isomeric 3β-acetoxy-5,14-dihydroxy-etio-allo-cholanic acid-methyl esters.

Having thus disclosed the invention, what is claimed is:

1. A process for the production of a 14-OH-cyclopentanopolyhydrophenanthrene, which comprises subjecting a $\Delta^{16}$-14,15-oxido-cyclopentanopolyhydrophenanthrene in a solvent and in the presence of a metallic hydrogenation catalyst to the action of hydrogen until the oxido-ring is split and a hydroxy group formed in the 14-position and the double bond in 16-position is saturated.

2. A process for the production of a 14-OH-20-keto-pregnane, which comprises subjecting a $\Delta^{16}$-14,15-oxido-20-keto-pregnene in a solvent and in presence of a metallic hydrogenation catalyst to the action of hydrogen until the oxide ring is split and a hydroxy group formed in the 14-position.

3. The process for the manufacture of a compound of the formula

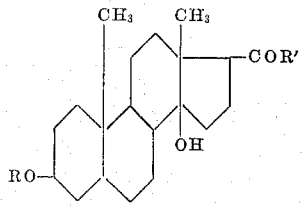

which comprises subjecting a compound of the formula

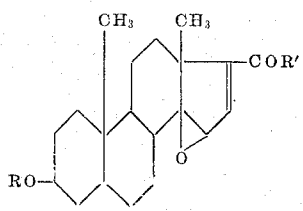

in a solvent and in presence of a metallic hydrogenation catalyst to the action of hydrogen until the oxide ring is split, a hydroxyl group formed in the 14-position, and the double bond in 16-position is saturated, R in the foregoing formulae representing a member selected from the group consisting of hydrogen and lower acyl, and R' representing a member selected from the group consisting of hydroxyl, lower alkoxy, lower acyloxy methyl and lower alkyl.

LEOPOLD RUZICKA.
PLACIDUS PLATTNER.

REFERENCES CITED

The following references are of record in the file of this patent:

UNITED STATES PATENTS

| Number | Name | Date |
|---|---|---|
| 2,265,143 | Butenandt | Dec. 9, 1941 |
| 2,302,135 | Miescher | Nov. 17, 1942 |
| 2,372,440 | Logemann | Mar. 27, 1945 |